United States Patent [19]

Wolf

[11] Patent Number: 4,627,228

[45] Date of Patent: Dec. 9, 1986

[54] METHOD OF AND APPARATUS FOR STARTING UP INDIVIDUAL WORKING ELEMENTS OF A TEXTILE MACHINE, E.G. A SPINNING MACHINE

[75] Inventor: Horst Wolf, Albershausen, Fed. Rep. of Germany

[73] Assignee: Zinser Textilmaschinen GmbH, Ebersbach, Fed. Rep. of Germany

[21] Appl. No.: 721,596

[22] Filed: Apr. 10, 1985

[30] Foreign Application Priority Data

Apr. 12, 1984 [DE] Fed. Rep. of Germany ....... 3413764

[51] Int. Cl.$^4$ .......................... D01H 13/00; F16H 7/12
[52] U.S. Cl. ........................................... 57/88; 57/105; 474/133
[58] Field of Search .................. 57/61, 78, 88, 104, 57/105, 89; 474/133

[56] References Cited

U.S. PATENT DOCUMENTS

| | | | |
|---|---|---|---|
| 2,718,747 | 9/1955 | Honig | 57/104 X |
| 2,892,302 | 6/1959 | Whitehead | 57/88 |
| 2,985,270 | 5/1961 | Landeros | 474/133 X |
| 3,036,421 | 5/1962 | Schröder | 57/88 |
| 3,256,684 | 6/1966 | Stahlecker et al. | 57/105 X |
| 3,314,227 | 4/1967 | Pfenningsberg | 57/105 X |
| 3,461,660 | 8/1969 | Nimtz et al. | 57/105 |
| 3,868,815 | 3/1975 | Stahlecker | 57/105 X |
| 4,103,479 | 8/1978 | Stahlecker et al. | 57/105 |

FOREIGN PATENT DOCUMENTS 2910814  10/1980  Fed. Rep. of Germany .......... 57/78

Primary Examiner—Stuart S. Levy
Assistant Examiner—Joseph J. Hail, III
Attorney, Agent, or Firm—Karl F. Ross; Herbert Dubno

[57] ABSTRACT

A textile machine has a spinning frame whose working elements, such as spindles, for respective whorls tangentially driven by a common belt. In order to allow energy efficient start-up of the individual whorls while the remaining whorls continue to be driven by the belt and without effecting the remaining whorls, the individual working element or spindles and their whorls are provided with a pivot pressing roller carrier whose pressing roller can hold the belt with normal pressing pressure at operating speed, can relieve the pressing pressure for braking of the individual whorl, and can press the belt with increased force against the individual whorl by manual operation of a lever individual to each mechanism for start-up.

18 Claims, 5 Drawing Figures

METHOD OF AND APPARATUS FOR STARTING UP INDIVIDUAL WORKING ELEMENTS OF A TEXTILE MACHINE, E.G. A SPINNING MACHINE

FIELD OF THE INVENTION

My present invention relates to a method of an to an apparatus for the start-up of belt-driven elements of a textile machine and, more particularly, to the start-up of working elements provided with whorls which are to be driven by a belt tangentially engaging the whorls of a number of such elements, e.g. a row of spindles of a spinning frame.

The term "working element" is used herein, therefore, to refer to any textile machine element operating directly or indirectly upon or on yarn, filaments, threads or rovings and which is driven by a belt via a whorl tangentially contacted by the belt.

The element which is most common in this application is a bobbin or a cop spindle, the rotors releasing rollers or other elements fulfilling the requirements of this definition are included as well. Hence any reference to a whorl can specifically be deemed to be a reference to the drive of the spindle of a particular spinning or twisting station of any spinning, twisting or doubler frame operating with a rotary spindle as a specific example, although the mechanism can be employed in the other applications here set forth as well.

BACKGROUND OF THE INVENTION

The power required for the start-up of a tangential belt-driven working element having a whorl contacted by the belt is several times greater than the power required for maintaining the element at the operating speed (nominal speed) for accomplishing the purposes of the element which can, as noted, be a spindle in a spinning machine.

The degree to which the start-up power or acceleration-phase power exceeds the normal drive power depends essentially upon the mass of the working element to be accelerated, upon the time in which the element must be brought from standstill to the operating speed and, to a certain extent, upon the amount of work done by the element at its operating speed.

In start-up of an entire textile machine, e.g. a spinning frame, it is possible to protract the acceleration phase so that the starting power required for simultaneously bringing all of the spindles up to the nominal or operating speed is relatively small. Alternatively, it is possible to supply a start-up driving power which is augmented temporarily and which is reduced when the spindles of the machine are simultaneously brought up to speed.

This, however, requires for the application of the starting power an appropriately dimensioned belt-pressing force and/or an increased contact area between the belt and the whorls of the spindles of the entire machine. When the nominal rotary operating speed is achieved, the increased belt pressure and/or the increased contact area (i.e. the contact arc of the belt against the whorl) is no longer necessary.

To reduce the belt-processing work and the consequent energy losses, a centrally operated actuating mechanism is provided to simultaneously control the belt-pressing force for all of the working elements of the machine.

Such a central actuating mechanism is extremely expensive and complex, is prone to breakdown and requires considerable maintenance. It also is not helpful when it is necessary to accelerate individual working elements, for example, once a thread or yarn has been knotted after a thread breakage and the spindle is to be set in motion again. It makes little sense to reduce the speed of all unaffected working elements to allow one or a limited number to be brought up to nominal speed, for example, and even if this is done, the fluctuation in speed which would then result with operative spindles or working elements would result in the danger of yarn breakage or irregular winding of the bobbins or cops.

A similar problem is posed when a section of working elements of the machine are to be simultaneously accelerated to nominal or operating speed upon, for example, a partial change of bobbins or bobbin cores or sleeves.

When the remaining working elements are to be uninterrupted and not modified as to their speeds, in the latter case, the automatic actuating system operating upon all of the working elements cannot be used or, if used, creates problems including the possibility of altering the speed of the working elements which are to continue in operation.

OBJECTS OF THE INVENTION

It is, therefore, the principal object of the present invention to provide an improved start-up device for individual working elements of a textile machine of the type described whereby the drawbacks enumerated above are obviated.

Another object of this invention is to provide, in a textile machine, means whereby energy consuming pressing work and friction work are minimized as to working elements which are to continue in operation whereas individual working elements can be brought rapidly from standstill to operating or nominal speed without detriment to the operation of those elements which are to continue to work uninterruptedly.

SUMMARY OF THE INVENTION

These objects and others which will become apparent hereinafter are attained, in accordance with the invention, in a method of starting up individual elements of a textile machine having a multiplicity of working elements, each with an individual whorl in tangential contact with a belt which is driven and wherein at least a number of these elements are driven by the tangential contact of their respective whorls with the belt and the working element at standstill has its whorl in tangential contact with the belt.

According to the invention, during the acceleration phase or start-up, I increase the belt-pressing force and/or the contact area of the belt with the whorl with respect to this latter element at least over the greater portion of the acceleration phase time and substantially to a nominal or operating speed. This allows a rapid acceleration of the latter working element without detriment to the continued operation of the remaining working elements.

According to a further feature of the invention, the frictional contact between the belt and the whorl of the working element to be started is rapidly brought to a maximum value, held at this value until the speed of the spindle or working element has been brought up to nominal speed and is then reduced to the friction prevailing during normal operation.

It will be apparent that toward the end of the speed increase there is a reduction in the friction force which represents a saving in energy.

The device for carrying out the method of this invention can comprise an actuating lever which can be indexed in a number of positions. In a normal drive position a pressing roller carried by this lever may urge the belt against the whorl with normal pressing force.

The lever, which also can be considered a pressing roll carrier, can also be indexed in a start-up position in which the pressing roller deflects the belt and thereby increases the contact area in the manner described as well as the pressing force.

Finally, to decelerate the working element at a maximum possible rate, this lever and roller carrier can be indexed in a third position, i.e. a braking position, in which a braking element is biased against the whorl and the pressing roller is fully displaced from contact with the belt.

The three positions may be located in succession oppositely to the manner in which they have been described, upon angular displacement of the lever so that such angular displacement first releases the brake and then swings the pressing lever into its start-up position. When the nominal speed is reached, of course, the lever can be swung still further into its operating position. The roller carrier can also be provided with a lifting roller which can lift the belt from any contact with the whorl in the braking position of the latter, thereby avoiding the energy loss due to continuous friction of the belt against the braked whorl when the latter is at standstill.

The indexing mechanism or detent device which is used can be of the spring-loaded ball type. Advantageously, the spring-loaded ball detent is provided on the roller carrier or lever and engages in recesses formed in a stationary member against which the detent is urged by its spring.

Spring-loaded detents of other rolling types may be used and the detent body may be a cylindrical (elongated) or disk shaped (flattened) roller, as desired.

According to a further feature of the invention, the roller carrier or its actuating lever is provided with an automatic means for returning the mechanism from its start-up position to its normal drive position. Such an automatic resetting device is intended to avoid any possibility that the mechanism will remain effective to increase the pressing force or the contact area once the working element has reached its nominal or operating speed.

Advantageously the resetting device comprises a ramp cooperating with the rolling body of the detent. Upon shifting of the roller carrier or actuating lever into the start-up position, the roller element further stresses the spring biasing it so as to load the detent. Upon release of the actuating lever, the compression force of the spring assists in urging the lever or the roller carrier to swing into its normal operating position.

When a working element is individually immobilized in a textile machine, this generally signifies some defect which must be corrected. The duration for which the individual working element station will remain out of service can vary and is generally unpredictable. As a result, it is desirable to ensure that the whorl will remain locked by the brake against rotation. The invention thus provides for a locking means for retaining the actuating lever or roller carrier in its braking position, this locking means being preferably provided in the form of a toggle lock or some other lock shiftable past an upper dead-center position.

For start-up, therefore, the actuating lever can be hald in its starting position by hand until the working element reaches the normal operating speed. The lever is then released and automatically is displaced at least in part with the aid of the aforementioned spring into the operating position.

When the start-up process is to be automated, according to a further feature of the invention, a lock-out arrangement is provided to ensure that the roller carrier will always be shifted, during start-up, first into its start-up position and only then into its operating position. The lock-out arrangement can include a lock for retaining the roller carrier in its start-up position and then switching it over to the operating position in which a further lock can be used to retain the roller carrier in its further position.

The point of switch-over can be determined by monitoring the speed of the working element or timing the lapse of a predetermined or preset duration in which the roller carrier is maintained in its locking position. As a consequence, the automatic control device of the invention can include a settable timer which is activated upon latching of the roller carrier in the start-up position or the aforementioned sensor monitoring the actual speed of the working element or its whorl in the case in which the switch-over is to be triggered by the speed sensor.

A settable timer ensures the termination of a start-up operation after the lapse of the predetermined time interval while the sensor effects the switch-over when the operating or nominal speed is reached.

As noted, I prefer not to allow the roller carrier to remain in the normal operating position until the acceleration phase has terminated since any period of time which the roller carrier is in the normal operating position, during the acceleration phase, merely delays acceleration of the whorl up to its nominal speed. Accordingly, I provide means whereby the latch for locking the roller carrier in its normal operating position can only be engaged after the roller carrier has been brought into its start-up position. The locking arrangement here too can be a dead point lock.

It has also been advantageous to provide a brake so that it remains actuated until the actuating lever has been shifted into its start-up position once the brake has been set for holding the lever at standstill. Abutments or the like can be provided on the actuating lever to control the brake in this manner.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 2:
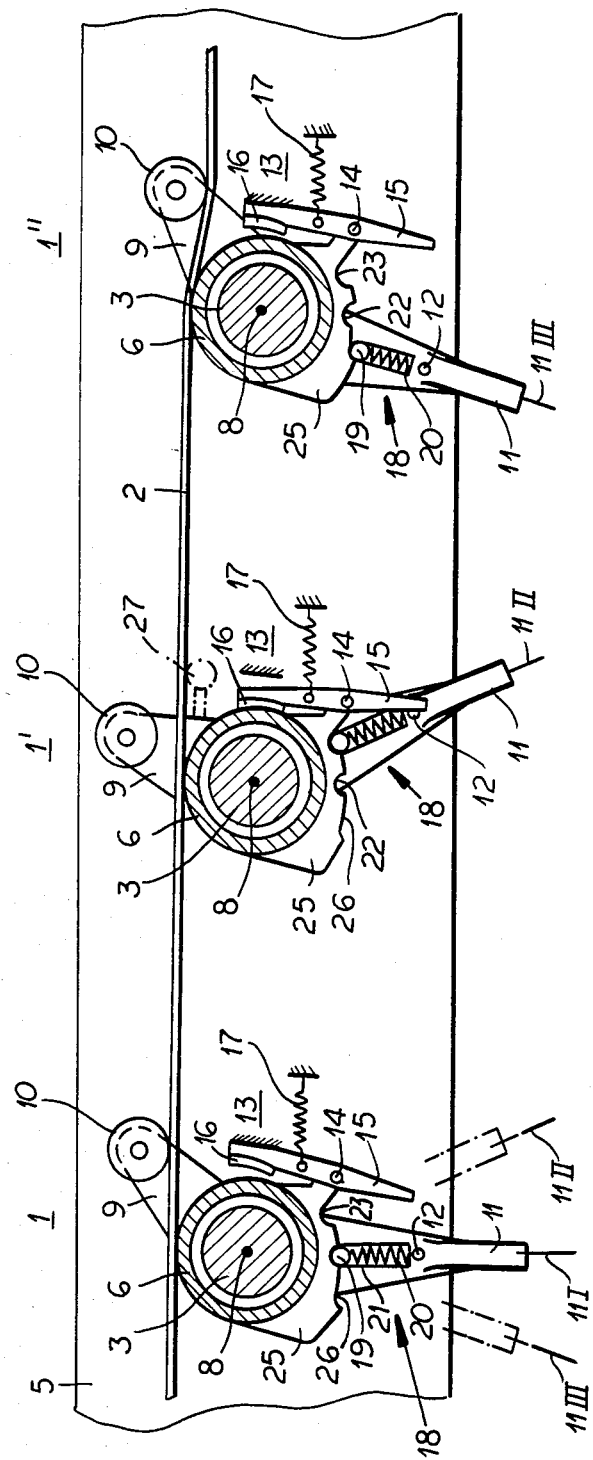
FIG. 2 is a diagrammatic horizontal section through a portion of a spindle bank for a spinning machine containing three working elements with the actuating levers and roller carriers thereof in three different positions according to the invention.
Figure 3:
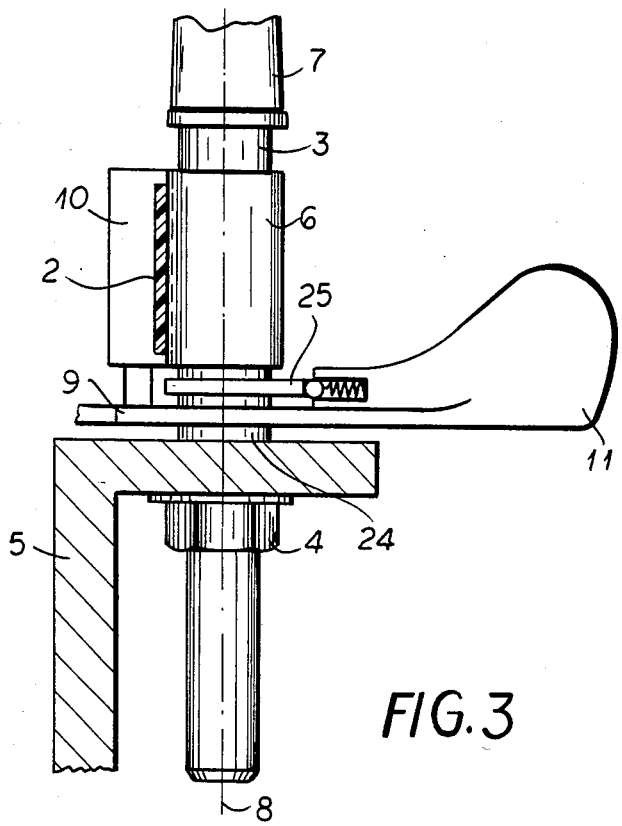
FIG. 3 is a schematic side view taken in vertical section through a spindle bank showing one of the working elements.

In the embodiment of FIGS. 2 and 3, the working elements 1, 1' and 1", namely, the respective spinning station of a spinning frame, are driven as are all of the spindles of this frame, by the same tangential belt 2. All three working elements are constructed identically and the parts thereof have been designated by the same reference numerals.

Each of the working elements comprises a spindle 3 which can hold a bobbin or cop core or sleeve and which is journaled on a carrier 5 by a journaling system represented diagrammatically at 4 in FIG. 3.

The spindle 3 is provided with a whorl 6 which is tangentially engaged by the belt 2 and can be driven thereby. FIG. 3 shows further that the spindle 3 carries the bobbin sleeve 7 upon which a yarn or thread can be wound.

A roller carrier 9 is swingable about the axis 8 of rotation of each whorl 6 and can be indexed in any of three positions by a detent arrangement which will be described subsequently.

The roller carrier 9 is provided with a roller 10 which engages the opposite side of the belt from that along which the whorls 6 are disposed. The three positions of each roller carrier have been shown in FIG. 2 and include an operating position 11 I, i.e. position in which the belt is tangential to the whorl and the whorl is driven at its nominal speed, a brake position 11 II in which a brake engages the whorl and, whereby the roller carrier is provided with a lifting roller 27, the belt is shifted away from the whorl 6 slightly, and a start-up position 11 III in which the pressing roller 10 increases the contact surface and pressing force of the belt upon the whorl, at least in part by forcing this belt to contact a greater arc of the circumference of the whorl.

FIG. 2 shows that the actuating lever 11 which is connected to the roller carrier 9 is in its operating position for the working element 1, in its braking position for the roller carrier 1' and in its start-up position for the working element 1".

In the operating position 11 I, the belt is pressed comparatively lightly by the roller 10 against the whorl whereas in the start-up position 11 III this pressing force is greater. In the brake position 11 II, the pressing roller 10 is swung away from and out of contact with the tangential belt 2 and simultaneously a pin 12 on the actuating lever engages a lever 15 to apply a brake body 16 of a braking device 13, previously ineffective, to the whorl.

More specifically, the brake device 13 includes a fulcrum 14 for the double-arm lever 15 and a spring 17 connected to this lever and normally biasing the brake shoe 16 out of engagement with the whorl. Consequently, when the pin 12 does not bias the lever 15 in the counterclockwise sense, the spring 17 draws this lever in the clockwise sense to hold the brake show out of engagement with the whorl.

The actuating lever is provided with a rolling-body detent arrangement generally represented at 18 for arresting the roller carrier 9 in the normal operating position 11 I and the brake position 11 II, the spring of this indexing means serving to bias the roller carrier into the normal operating position 11 I from the starting position 11 III.

The indexing means 18 comprises a ball 19 which is biased by a compression spring 20 within a guide housing 21 shown only diagrammatically and mounted upond the lever 11.

The indexing means 18 cooperates with indexing recesses 22 and 23 which are formed in a plate 25 mounted on the support 5 above the spindle bearing 24.

The recess 22 is the operating position recess while the recess 22 is the braking position recess.

In addition, the plate 25 is provided with a ramp 26 that cooperates with the indexing means 18 under the force of the spring 20 to cam the roller carrier 9 into the operating position and the indexing means into engagement with the detent 22 when the lever 11 has been brought into the position 11 III shown at the right hand side of FIG. 2. Upon the setting of the lever 11 into this position, the spring 20 is compressed and this compression force becomes available to spring the lever into its operating position when the lever is released.

Figure 4:
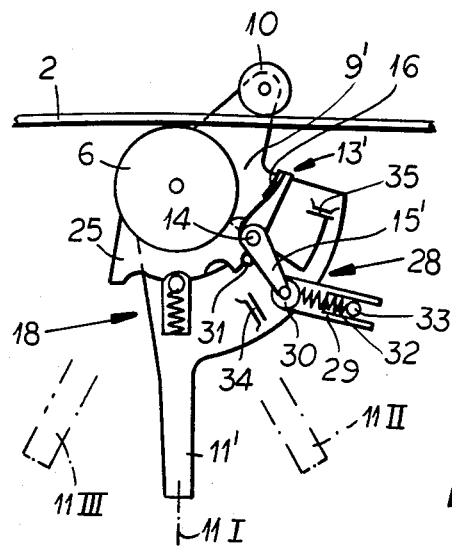
FIG. 4 is a diagrammatic plan view illustrating a second embodiment of the invention.

The belt-lifting roller 27 has been shown in broken lines because, although it is preferably provided, it is not absolutely essential. The embodiment of FIG. 4 differs from that of FIGS. 2 and 3 in that it provides a different configuration of the brake device 13' and of the roller carrier 9'. The brake device 13' here includes a locking unit 28 for the brake position 11 III. This locking unit is a dead point lock, i.e. a lock which is spring biased into two stable positions and must be shifted through a dead point position before springing into either of these two positions by displacement in the appropriate direction.

The double-arm lever 15' can thus be provided in which the two arms angularly adjoin, one arm carrying the brake shoe 16 while the other arm forms a toggle articulation 30 which is loaded by a spring 32 seat against the guide pin 33 along which a spring guide 29 can slide and with respect to which this guide can pivot.

A stop pin 31 on the plate 25 limits the clockwise swing of this toggle linkage. The engagement of the brake shoe 16 with the whorl 6 limits the counterclockwise swing of this toggle linkage.

Upon movement of the lever 11' into the braking position 11 II, the abutment 34 engages the toggle joint and shifts it in the counterclockwise sense about the fulcrum of the lever 15', swinging this joint past the dead center position and along it to spring into its other extreme position (not shown) in which the toggle joint lies on the opposite side of the dead center position which is defined by an imaginary line connecting the pin 33, the fulcrum 14 of the lever 15'. In this position, the brake shoe 16 is applied to the whorl. The lever 11' is likewise held in this braking position with its roller 10 out of engagement with the belt and any lifting roller effective to hold the belt 2 out of engagement with the whorl.

Until with the lever 11' is forceably swung in the opposite sense to the starting position 11 III and past the operating position does the abutment 35 operate the lock to displace the lever 15' in the clockwise sense and switch over the toggle linkage.

Figure 5:
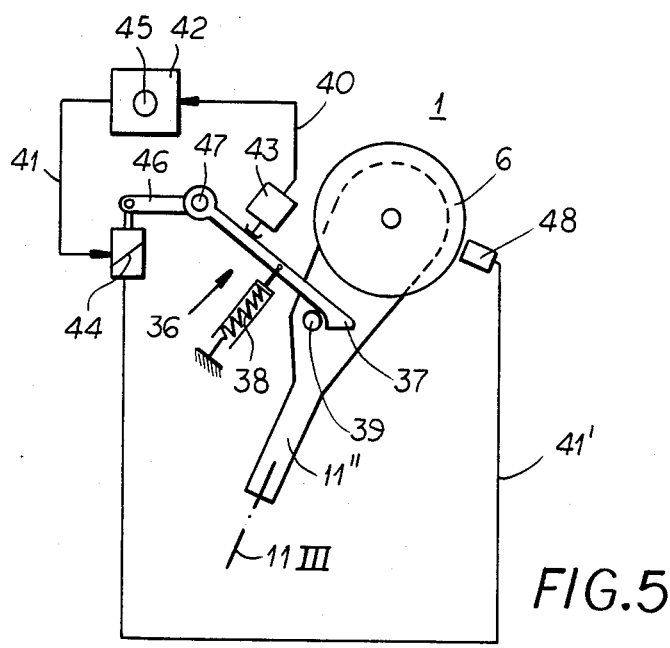
FIG. 5 is another diagrammatic plan view showing a third embodiment of this invention.

FIG. 5 shows a modification which can be used with any of the embodiments previously illustrated and thus only the important components necessary for a discussion of this variant have been illustrated.

In FIG. 5 the actuating lever 11" is provided with a latch in the form of a pawl 37 which holds the lever 11" in the start-up position 11 III, the pawl 37 engaging a pin 39. The pawl 37 is biased into engagement with the pin by a spring 38 of the latch or lock 36 and can be released by solenoid 44 acting upon an arm 46 reached with pawl 37 which is pivoted at 47.

Consequently, as the lever 11″ is swung fully in its clockwise sense, the pin 39 cams the end of the pawl 37 upwardly and lodges behind it. A sensor 43 is responsive to the latching of the pawl 37 and triggers a timer 42 to which it is connected by line 40, the elapse of a time preset by knob 45 generating a pulse which operates solenoid 44 to release the lever 11″ and permit the roller carrier to spring into its operating position 11 II as described with either of the two embodiments previously discussed.

Alternatively or as a fail-safe measure even if the timer is provided, a sensor 48 is juxtaposed with the whorl or a rotatably driven part thereof to monitor the rotary speed or peripheral speed and to delivery a signal 41′ to operate the solenoid 44 when the whorl has been brought up to nominal speed. The speed sensor 48 can likewise be adjustable to respond to a given threshold defining the nominal speed.

Figure 1:
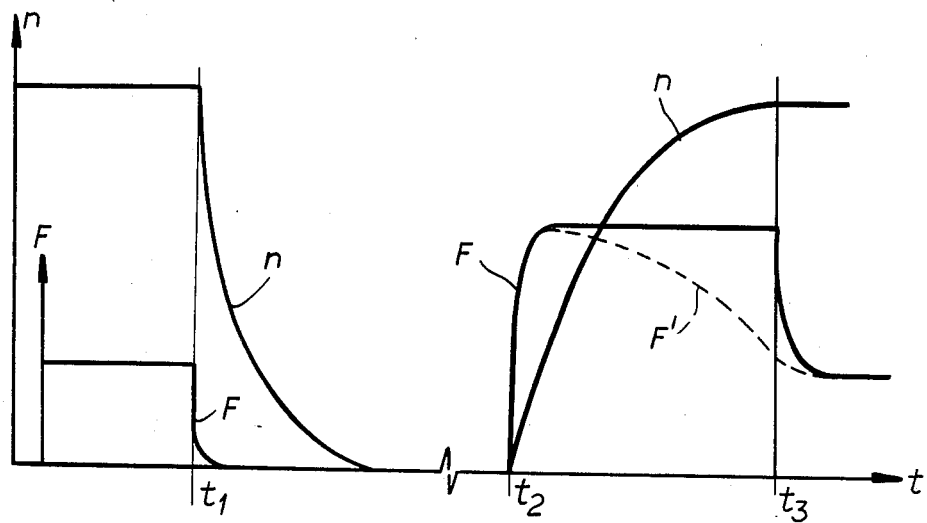
FIG. 1 is a graph in which the belt-pressing force F and the speed n of the working element (in RPM) are plotted along the ordinate versus time along the abscissa, illustrating the start-up process of the invention.

From FIG. 1 it can be seen that the speed n is comparatively high and the pressing force F of the belt against the whorl of an individual whorl during normal operation is comparatively low until shutdown of the individual working element at the point represented at $t_1$. At this point the speed falls and the pressing force drops more rapidly as illustrated. Both remain at zero until start-up is initiated at point $t_2$.

At this point, in accordance with the invention, a high pressing force is immediately applied and there is a progressive but nevertheless quite rapid buildup of the speed n until the point $t_3$ is reached, i.e. the speed of the whorl has reattained its nominal speed. At this point the belt-pressing force is then reduced or relieved. An alternative also within the present invention has been represented in FIG. 1 in broken lines, whereby once the maximum pressing force is attained, this force is progressively reduced following the time course F′ until its normal operating value is again achieved.

I claim:

1. A method of starting up individual working elements of a textile machine in which a multiplicity of working elements each have a whorl in tangential contact with a common belt, comprising, while a number of said elements are driven by tangential contact at a normal operating pressing force of their respective whorls with said belt at a given operating speed, the steps of:

individually starting up one of said elements from standstill over an acceleration interval to said operating speed by applying said belt to said whorl of said element at standstill with a substantially greater friction force than that between said belt and the whorls of said elements at said operating speed;
    by applying said belt with increased pressing force against the whorl of the accelerated element:
    maintaining a greater friction force between said belt and the whorl of the element thus accelerated from standstill over at least a major portion of said acceleration interval by the application of increased pressing force of the belt against the whorl of the accelerated element; and
    decreasing the pressing force applied by said belt to the accelerated whorl to said normal operating pressing force when the latter whorl reaches said given operating speed.

2. The method defined in claim 1 wherein the increased pressing force results from an increase in the area of contact generated between said belt and the whorl of the accelerated element.

3. The method defined in claim 1 wherein the increase in friction force is effected rapidly to a maximum and is thereafter reduced slowly to a friction force corresponding to that between said belt and the whorls at said operating speed.

4. In a textile machine having a multiplicity of working elements each with a respective whorl tangentially engaged by a common drive belt for rotating said elements at a normal operating speed, the improvement which comprises a respective:

a respective start-up mechanism individual to each of said elements, and operable independently of the other start-up elements and without effecting continuing drive of said elements at said operating speed, each of said mechanisms comprising a swingable roller carrier having a belt-pressing roller engageable with said belt, an actuating lever connected to said roller carrier for shifting same into a normal operating position in which said belt engages the respective whorl with a normal friction force corresponding to that required to maintain the respective working element at said operating speed once it has reached said operating speed, and a start-up position wherein said pressing roller urges said belt against the respective whorl for increased friction force during start-up; and
    indexing means for releasably retaining said lever in at least said operating position.

5. The improvement defined in claim 4 wherein each of said mechanisms further comprises a brake actuatable by movement of the respective lever into a braking position, said braking means including a brake shoe engageable with said whorl, said pressing roller relieving the friction force of said belt against the respective whorl in said braking position.

6. The improvement defined in claim 5, further comprising a lifting roller on said carrier engaging said belt for lifting same out of engagement with the respective whorl in the braking position of the respective lever.

7. The improvement defined in claim 6 wherein said indexing means indexes said releasable lever in said braking position.

8. The improvement defined in claim 5 wherein each of said mechanisms further comprises locking means for retaining said lever in said brake position.

9. The improvement defined in claim 5, further comprising means for maintaining the respective whorl braked until the respective lever has been shifted into said start-up position.

10. The improvement defined in claim 4 wherein said indexing means includes a spring-loaded roller body engageable in a detent.

11. The improvement defined in claim 4, further comprising latch means for releasably locking said lever in said start-up position.

12. The improvement defined in claim 11 wherein said latch means includes a swingable pawl.

13. In a textile machine having a multiplicity of working elements each with a respective whorl tangentially engaged by a common drive belt for rotating said elements at a normal operating speed, the improvement which comprises:

a respective start-up mechanism individual to each of said elements, and operable independently of the other start-up elements and without effecting continuing drive of said elements at said operating speed, each of said mechanisms comprising a swingable roller carrier having a belt-pressing roller engageable with said belt, an actuating lever connected to said roller carrier for shifting same into a normal operating position in which said belt engages the respective whorl with a normal friction force corresponding to that required to maintain the respective working element at said operating speed once it has reached said operating speed, and a start-up position wherein said pressing roller urges said belt against the respective whorl for increased friction force during start-up; and indexing means for releasably retaining said lever in at least said operating position, said indexing means including a spring-loaded roller body engageable in a detent, said spring-loaded roller body cooperating with a ramp to automatically swing said lever from said start-up position to said operating position.

14. The improvement defined in claim 13 wherein said spring-loaded roller body has a spring-loaded ball provided on said lever and cooperating with a stationary plate disposed above a bearing for said whorl, said plate being provided with at least one indexing recess receiving said ball and with said ramp.

15. In a textile machine having a multiplicity of working elements each with a respective whorl tangentially engaged by a common drive belt for rotating said elements at a normal operating speed, the improvement which comprises:

a respective start-up mechanism individual to each of said elements, and operable independently of the other start-up elements and without effecting continuing drive of said elements at said operating speed, each of said mechanisms comprising a swingable roller carrier having a belt-pressing roller engageable with said belt, an actuating lever connected to said roller carrier for shifting same into a normal operating position in which said belt engages the respective whorl with a normal friction force corresponding to that required to maintain the respective working element at said operating speed once it has reached said operating speed, and a start-up position wherein said pressing roller urges said belt against the respective whorl for increased friction force during start-up;

indexing means for releasably retaining said lever in at least said operating position, each of said mechanisms further comprising a brake actuatable by movement of the respective lever into a braking position, said braking means including a brake shoe engageable with said whorl, said pressing roller relieving the friction force of said belt against the respective whorl in said braking position; and locking means for retaining said lever in said brake position, said locking means including a dead point toggle lock.

16. In a textile machine having a multiplicity of working elements each with a respective whorl tangentially engaged by a common drive belt for rotating said elements at a normal operating speed, the improvement which comprises:

a respective start-up mechanism individual to each of said elements, and operable independently of the other start-up elements and without effecting continuing drive of said elements at said operating speed, each of said mechanisms comprising a swingable roller carrier having a belt-pressing roller engageable with said belt, an actuating lever connected to said roller carrier for shifting same into a normal operating position in which said belt engages the respective whorl with a normal friction force corresponding to that required to maintain the respective working element at said operating speed once it has reached said operating speed, and a start-up position wherein said pressing roller urges said belt against the respective whorl for increased friction force during start-up;

indexing means for releasably retaining said lever in at least said operating position;

latch means for releasably locking said lever in said start-up position, said latch means including a swingable pawl; and timing means triggered upon engagement of said pawl for automatically releasing same after the lapse of a predetermined time period.

17. In a textile machine having a multiplicity of working elements each with a respective whorl tangentially engaged by a common drive belt for rotating said elements at a normal operating speed, the improvement which comprises:

a respective start-up mechanism individual to each of said elements, and operable independently of the other start-up elements and without effecting continuing drive of said elements at said operating speed, each of said mechanisms comprising a swingable roller carrier having a belt-pressing roller engageable with said belt, an actuating lever connected to said roller carrier for shifting same into a normal operating position in which said belt engages the respective whorl with a normal friction force corresponding to that required to maintain the respective working element at said operating speed once it has reached said operating speed, and a start-up position wherein said pressing roller urges said belt against the respective whorl for increased friction force during start-up;

indexing means for releasably retaining said lever in at least said operating position;

latch means for releasably locking said lever in said start-up position, said latch means including a swingable pawl; and means responsive to the speed of each whorl for automatically releasing the respective pawl when the respective whorl has reached said operating speed.

18. In a textile machine having a multiplicity of working elements each with a respective whorl tangentially engaged by a common drive belt for rotating said elements at a normal operating speed, the improvement which comprises:

a respective start-up mechanism individual to each of said elements, and operable independently of the other start-up elements and without effecting continuing drive of said elements at said operating speed, each of said mechanisms comprising a swingable roller carrier having a belt-pressing roller engageable with said belt, an actuating lever connected to said roller carrier for shifting same into a normal operating position in which said belt engages the respective whorl with a normal friction force corresponding to that required to maintain the respective working element at said operating speed once it has reached said operating speed, and a start-up position wherein said pressing roller urges said belt against the respective whorl for increased friction force during start-up;

indexing means for releasably retaining said lever in at least said operating position, each of said mechanisms further comprising a brake actuatable by movement of the respective lever into a braking position, said braking means including a brake shoe engageable with said whorl, said pressing roller relieving the friction force of said belt against the respective whorl in said braking position; and means for maintaining the respective whorl braked until the respective lever has been shifted into said start-up position, the last-mentioned means including a pair of abutments on said lever engageable with a brake lock with lost motion.

* * * * *